United States Patent [19]
Geoffroy

[11] Patent Number: 5,143,486
[45] Date of Patent: Sep. 1, 1992

[54] FLOW PROMOTER FOR FLUIDIZED SOLIDS

[75] Inventor: David R. Geoffroy, Holden, Mass.

[73] Assignee: Riley Stoker Corporation, Worcester, Mass.

[21] Appl. No.: 662,754

[22] Filed: Mar. 1, 1991

[51] Int. Cl.$^5$ ............................................. B65G 53/16
[52] U.S. Cl. ........................................ 406/90; 406/91; 406/137; 406/146; 222/195; 366/106; 366/191
[58] Field of Search ................ 406/90, 91, 136–138, 406/146, 122; 222/195; 366/106, 107, 341, 191

[56] References Cited

U.S. PATENT DOCUMENTS

| | | | |
|---|---|---|---|
| 554,300 | 2/1896 | Parker | 406/137 X |
| 2,393,932 | 1/1946 | Petroe | 406/122 X |
| 2,707,132 | 4/1955 | Baresch | 406/137 X |
| 2,781,300 | 2/1957 | Hoge . | |
| 2,916,441 | 12/1959 | Kruse, Jr. . | |
| 2,975,000 | 3/1961 | Davis, Jr. | 406/136 |
| 3,332,853 | 7/1967 | Urquhart . | |
| 3,351,391 | 11/1967 | Green | 406/138 |
| 3,355,222 | 11/1967 | Neely | 406/138 |
| 3,407,972 | 10/1968 | Cymbalisty | 406/137 X |
| 3,795,487 | 3/1974 | Tamalet . | |
| 4,265,572 | 5/1981 | Bourdois et al. | 406/137 X |
| 4,346,054 | 8/1982 | Löfgren et al. . | |
| 4,400,150 | 8/1983 | Smith et al. . | |
| 4,446,799 | 5/1984 | Andersen . | |
| 4,448,134 | 5/1984 | Foote . | |
| 4,574,743 | 3/1986 | Claus . | |
| 4,693,682 | 9/1987 | Lee et al. . | |
| 4,784,533 | 11/1988 | Teigen . | |
| 4,885,137 | 12/1989 | Lork . | |

FOREIGN PATENT DOCUMENTS

| | | | |
|---|---|---|---|
| 19689 | 2/1956 | Fed. Rep. of Germany | 406/138 |
| 1108979 | 1/1956 | France | 406/138 |
| 117964 | 7/1958 | U.S.S.R. | 406/136 |
| 755728 | 8/1980 | U.S.S.R. | 406/138 |
| 527250 | 10/1940 | United Kingdom | 406/137 |
| 738026 | 10/1955 | United Kingdom | 406/90 |
| 1025308 | 4/1966 | United Kingdom | 406/138 |

Primary Examiner—Margaret A. Focarino
Assistant Examiner—James M. Kannofsky
Attorney, Agent, or Firm—Mason, Kolehmainen, Rathburn & Wyss

[57] ABSTRACT

A device for promoting the flow rate of solid particulates from a fluidized bed of solids into a downcomer extending from a discharge outlet in a wall or the bed includes a hollow, funnel-like, horn element having a lower end connected upstream of the discharge outlet and an upper end portion spaced upwardly of the lower end and flared outwardly at progressively higher levels to form an enlarged flow entrance for the fluidized solid particulates to move from said bed toward said discharge outlet into the downcomer. The funnel-like, horn element has an enlarged open upper end formed with a rim around the flow entrance spaced above the lower wall of the bed and has a flow cross-section substantially greater than that of the discharge outlet. A bubble ring is provided adjacent the rim for injecting gaseous fluid into the solids to fluidize the solid particulates for movement in a generally horizontal direction towards a center axis of the flow entrance of the funnel-like, horn element.

6 Claims, 2 Drawing Sheets

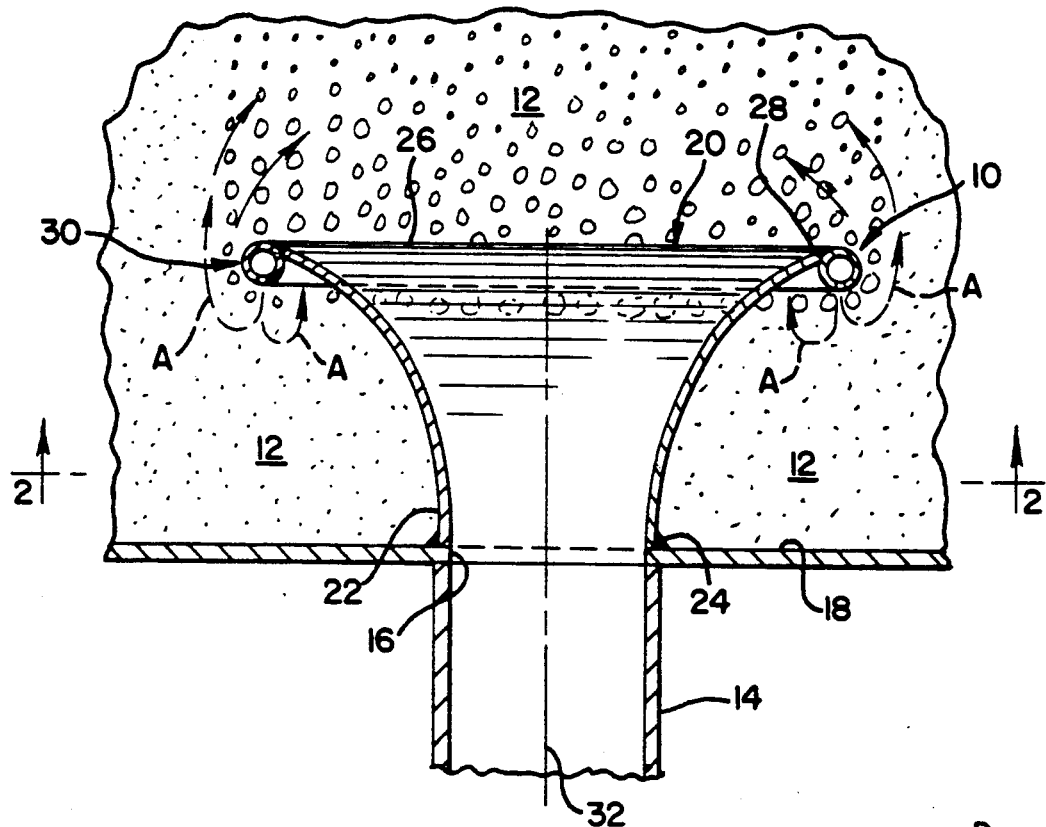
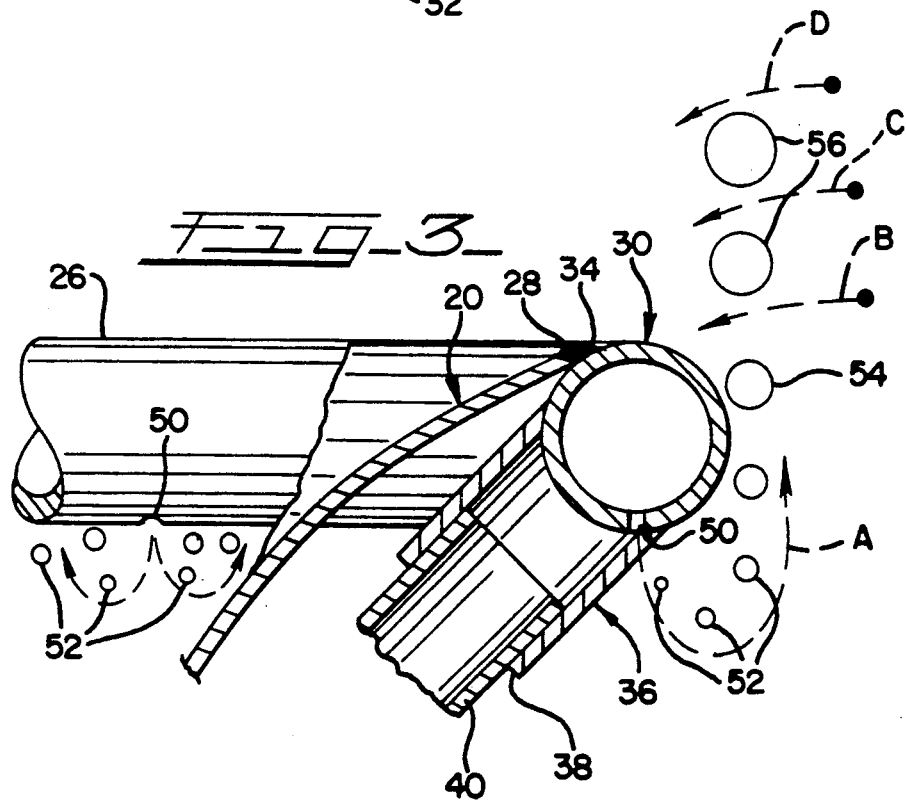

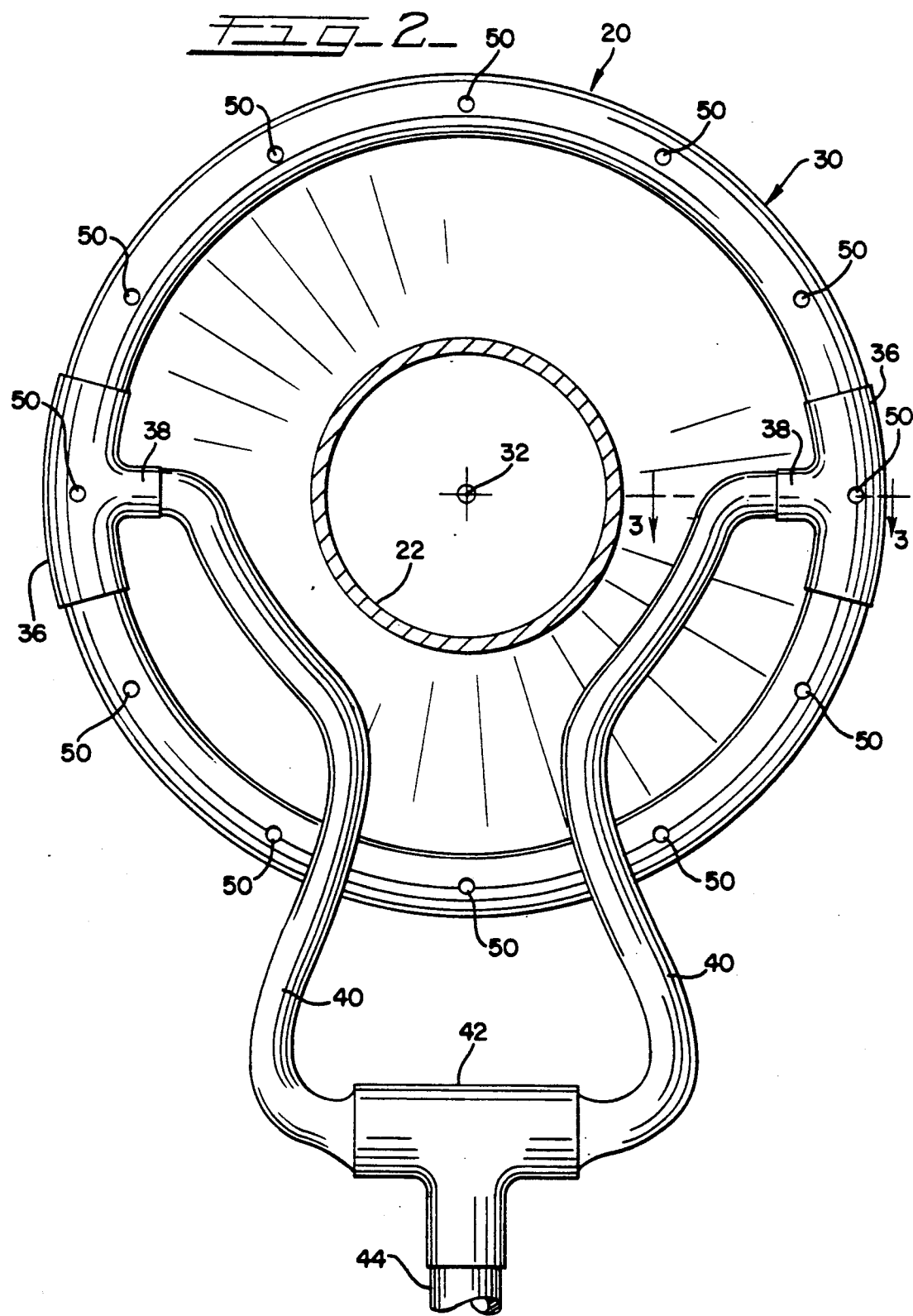

FLOW PROMOTER FOR FLUIDIZED SOLIDS

BACKGROUND OF THE INVENTION

1. Field of the Invention

The present invention relates to a new and improved flow promoter for fluidized solids and, more particularly, to an apparatus for promoting the flow rate of solid particulates from a fluidized bed into a downcomer extending downwardly of a discharge outlet formed in a bottom wall of the bed.

2. Background of the Prior Art

In fluidized bed heat generating systems, sometimes the solid particulates that are used as a heat exchange medium are difficult to move out of a fluidized solids bed into a downcomer for continuing circulation or passage through the system. This is particularly true where a downcomer joins a bottom wall of a solids bed container at a squared inlet at right angles to a wall. Oftentimes the solid particulate material at lower levels in a fluidized bed tend to gravitate out and remain in a more or less stationary position in comparison to upper layers of material which are constantly being buoyed upwardly by fluidizing gas and tend to move more freely and with horizontal components of velocity. In either event, it is sometimes difficult to insure high flow rates of material from one fluidized solid bed to other components in a fluidized bed heat generating system.

It is known that liquids tend to flow better into a flared or enlarged entrance opening leading into a duct or pipe in comparison to a squared edge inlet configuration. Fluidized solid particles behave somewhat similar to liquids but are different in several aspects. A flared or enlarged inlet for solid particulates may improve the flow rate into a transport duct, however, sometimes this alone is not enough to provide the desired flow rates of material that is needed for moving material from a fluidized solids bed into a downcomer or the like. One of the reasons or limiting factors in retarding solids flow from a fluidized bed into a downcomer is the fact that the solids must move generally in a horizontal direction or at least with a horizontal component of velocity towards the centerline of the downcomer or discharge outlet.

Experimentation has shown that as the fluidized solids flow downwardly into a downcomer inlet, a void or open space at the center of the downcomer entrance is created. This void area or space results in lower flow rates out of the fluidized bed in comparison to a system wherein the void area is completely or partially filled with the fluidized solid particulates preparing to move downwardly toward a downcomer connected to an outlet of the fluidized bed. If the amount of vertical run of a downcomer between a fluidized solids bed and a next-in-line system component is limited and solids flow rate improvement is needed, a flow promoter in accordance with the present invention has proved especially valuable.

The following patents disclose systems or components wherein solid particulates are flowing or circulating between different locations and the patents employ various means for enhancing the fluid flow of the solid particulates: Hoge U.S. Pat. No. 2,781,300; Kruse, Jr. U.S. Pat. No. 2,916,441; Urquhart U.S. Pat. No. 3,332,853; Tamalet U.S. Pat. No. 3,795,487; Lofgren et al. U.S. Pat. No. 4,346,054; Smith et al. U.S. Pat. No. 4,400,150; Andersen U.S. Pat. No. 4,446,799; Foote U.S. Pat. No. 4,448,134, Claus U.S. Pat. No. 4,574,743; Lee et al. U.S. Pat. No. 4,693,682, Teigen U.S. Pat. No. 4,784,533; and Lork U.S. Pat. No. 4,885,137.

OBJECTS OF THE PRESENT INVENTION

It is an object of the present invention to provide a new and improved flow enhancing device for fluidized solids.

More particularly, it is especially desirable and an object of the invention to provide a new and improved flow promoter for enhancing the flow of fluidized solids from a bed of solid materials into a downcomer at an outlet of the bed.

Still another object of the present invention is to provide a new and improved flow promoter of the character described which is especially adapted for enhancing and increasing the flow rate of particulate solids from a fluidized bed into a downcomer or other duct leading to a remote location.

It is still another object of the present invention to provide a new and improved bubble ring type flow promoter for increasing the flow of fluidized solids from a fluid bed into a downcomer duct.

Another object of the present invention is to provide a new and improved flow promoter for fluidized solids of the character described which is simple in construction, reliable in operation and economical to produce and utilize in a system employing fluidized solid particulates as a heat exchange medium.

BRIEF SUMMARY OF THE PRESENT INVENTION

The foregoing objects and advantages of the present invention are accomplished in an illustrated embodiment herein comprising a new and improved device for promoting the flow rate of solid particulates from a fluidized solids bed into a downcomer extending away from a discharge outlet or opening formed in a bottom wall of an enclosure containing the fluidized bed. The flow promoting device includes a hollow, funnel-shaped element having a lower end connected upstream of a discharge outlet or opening in a fluidized bed containing enclosure. The funnel-shaped element has an upper end portion projecting upwardly and flared or enlarged like a horn at progressively higher levels above the bottom wall to form an enlarged, circular flow entrance for accommodating fluidized solid particulates flowing out of the solids bed toward a discharge outlet into a downcomer. The flared, funnel-like element has an open upper end formed with a peripheral rim defining the flow entrance and the rim is spaced above the level of a bottom wall of a housing or enclosure containing the fluidized bed. The flow entrance has a transverse flow cross-section that is substantially greater in area than that of the discharge outlet and downcomer at the lower level or bottom wall of the fluidized bed.

Bubble means is provided adjacent the rim and encircles the flow entrance for injecting gaseous fluid into the bed of solids to better fluidize the solid particulates in the immediate area round the flow entrance. As the bubbles of gas expand and enlarge in size, they move upwardly causing the solid particulates to move and flow more easily and freely and with a horizontal directional velocity component. Thus, the solid particulates move rapidly towards a normally void or open space at the center portion of the flow entrance and then pass rapidly downwardly in the funnel-shaped element into the downcomer.

BRIEF DESCRIPTION OF THE DRAWINGS

For a better understanding of the present invention, reference should be had to the following detailed description taken in conjunction with the drawings, in which:

FIG. 1 is an enlarged vertical cross-sectional view of a flow promoter for moving fluidized solids in a fluidized solids bed;

FIG. 2 is a horizontal view looking upwardly along the lines 2—2 of FIG. 1, illustrating the construction of a bubble ring in accordance with the present invention; and FIG. 3 is a fragmentary enlarged cross-sectional view taken substantially along lines 3—3 of FIG. 2.

DETAILED DESCRIPTION OF A PREFERRED EMBODIMENT OF THE INVENTION

Referring now more particularly to the drawings, therein is illustrated a new and improved apparatus 10 for promoting the flow rate of solid particulates from a fluidized solids bed 12 into a downcomer 14 connected to a circular outlet opening 16 formed in a bottom wall 18 of a housing or enclosure supporting and containing the fluidized solids bed 12.

In accordance with the present invention, the flow promoter apparatus 10 includes a horn or funnel-shaped flow enhancer 20 having a minimum diameter lower end 22 with an internal diameter matching that of the downcomer or discharge duct 14. The lower end 22 of the flow enhancer 30 is secured to the bottom wall 18 by appropriate means such as a weld ring 24. The funnel-shaped, horn element 20 is flared or expanded in size to enlarge in diameter upwardly of the lower end level to reach a maximum diameter at an upper end level 26 forming a circular flow entrance 28 that is encircled by an annular rim or bubble ring 30. As indicated in FIG. 1, the diameter of the circular flow entrance 28 may be two or three times the diameter of the outlet 16 and downcomer duct 14 and is concentric therewith aligned along a common vertical axis 32.

The bubble rim structure 30 comprises a hollow, tubular ring of circular shape secured to the upper surface of the funnel-shaped horn 20 by appropriate means such as an annular weld bead 34.

In accordance with the present invention, the circular, bubble rim 30 is supplied with fluidizing gas through one or more Tee fittings 36, each having a right angle leg 38 connected to a source of pressurized gaseous fluid (not shown) through a flexible air line or supply hose 40 (FIG. 2), in turn connected through a Tee fitting 42 to a principal supply line 44.

In accordance with the present invention, gaseous fluid is supplied to the interior of the bubble ring 30 and is injected into the solid particulate matter contained in the solid bed 12 through a plurality of injection ports 50 spaced equilaterally around the rim 30 on the underside thereof. These ports 50 are of relatively small size and the fluidizing gas enters into the mass of solid particulate matter at high velocity forming small bubbles 52. The injection of fluidizing gas from the ports 50 into the solid particulates of the fluidized bed 12 is similar to bubbles of gas injected into a liquid beneath the surface thereof. These bubbles initially move downwardly and then turn around and rise upwardly as indicated by the arrows A gradually expanding in size as indicated by the larger bubbles 54 and 56 in FIG. 3. Bubbles reaching higher and higher levels in the mass of solid particulates contained in the fluidized bed 12 tend to mobilize the solid particulates and cause them to flow more freely and with a horizontal directional component as indicated by the arrows B, C and D in FIG. 3. The solid particulate matter thus tends to float and flow at a much more rapid rate towards a void or low pressure region at the center of the funnel structure 20 around the central axis 32.

It has been found by experimentation that the injection of relatively small quantities of air or other gases from the small, equilaterally spaced ports 50 around the underside of the circular bubble ring 30 tends to dramatically increase the flow rate of solid particulate matter from the fluidized bed 12 towards the centerline 32 to flow downwardly in the flared funnel-like, horn structure 20 towards the lower outlet end 22 connected to the downcomer 14. Moreover, even though the upper level 26 of the funnel-like, horn structure 20 is spaced above the level of the bottom wall 18, the downwardly injected fluidizing gases moving from the injection ports 50 tends to maintain the solid particulates in the lower level portions of the bed 12 in a highly fluidized condition.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A device for promoting the flow rate of solid particulates from a fluidized bed into a downcomer extending from a discharge outlet formed in a wall beneath said bed, said device comprising:

a hollow, generally funnel-shaped element having a lower end connected upstream of said discharge outlet and an upper end portion upwardly of said lower end flared outwardly at progressively higher levels above said wall to form an enlarged flow entrance for said fluidized solid particulates to move from said bed toward said discharge outlet into said downcomer;

said funnel element having an open upper end forming a rim around said flow entrance spaced above said wall and having a flow cross-section greater than that of said discharge outlet; and bubble means adjacent said rim for injecting gaseous fluid into said bed to fluidize said solid particulates to move more easily toward said flow entrance of said funnel element, said bubble means comprising an annular hollow fluid conduit supplied with pressurized fluid and having gaseous fluid outlets spaced apart thereon for injecting said gaseous fluid into said bed of solid particulates, said annular fluid conduit comprising a generally circular ring adjacent the level of said flow entrance with said gaseous fluid outlets spaced apart around said ring, and formed on a lower portion of said ring away from said flow entrance.

2. A device of claim 1, wherein:
   said cross-section of said flow entrance is generally circular.

3. The device of claim 1, wherein:

said gaseous fluid outlets are positioned to inject said gaseous fluid in a downward direction relative to said flow entrance.

4. A device for promoting the flow rate of solid particulates from a fluidized bed into a downcomer extending from a discharge outlet formed in a wall beneath said bed, said device comprising:

a hollow, generally funnel-shaped element having a lower end connected upstream of said discharge outlet and an upper end portion upwardly of said lower end flared outwardly at progressively higher levels above said wall to form an enlarged flow entrance for said fluidized solid particulates to move from said bed toward said discharge outlet into said downcomer, said flow entrance having a generally circular flow cross-section larger than the flow cross-section of said discharge outlet and aligned in concentric alignment with said discharge outlet;

said funnel element upper end portion having an open upper end forming a rim around said flow entrance spaced above said wall; and bubble means adjacent said rim for injecting gaseous fluid into said bed to fluidize said solid particulates to move more easily toward said flow entrance of said funnel element, wherein said means for injecting gaseous fluid comprises an annular hollow fluid conduit secured to said rim and adapted to be supplied with pressurized gaseous fluid and having a plurality of gaseous fluid outlets for injecting said gaseous fluid into said bed of solid particulates.

5. The device of claim 4, wherein:

said gaseous fluid outlets in said fluid conduit are spaced equilaterally around said flow entrance.

6. The device of claim 5, wherein:

said rim comprises an integral wall portion of said fluid conduit.

* * * * *